N. JONES.
Car-Axle.

No. 197,375.        Patented Nov. 20, 1877.

Witnesses:
P. C. Dieterich.
Frank H. Duffy.

Inventor:
Nathaniel Jones.
Per C. H. Watson & Co. Attorneys.

UNITED STATES PATENT OFFICE.

NATHANIEL JONES, OF SYRACUSE, NEW YORK.

IMPROVEMENT IN CAR-AXLES.

Specification forming part of Letters Patent No. 197,375, dated November 20, 1877; application filed November 9, 1877.

*To all whom it may concern:*

Be it known that I, NATHANIEL JONES, of Syracuse, in the county of Onondaga and State of New York, have invented certain new and useful Improvements in Car-Axles; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a divided axle, with wheels movable independent of each other, and capable of extension and contraction, adapted for railroad and street-railroad cars, and other purposes, as will be hereinafter more fully set forth.

Figure 1:
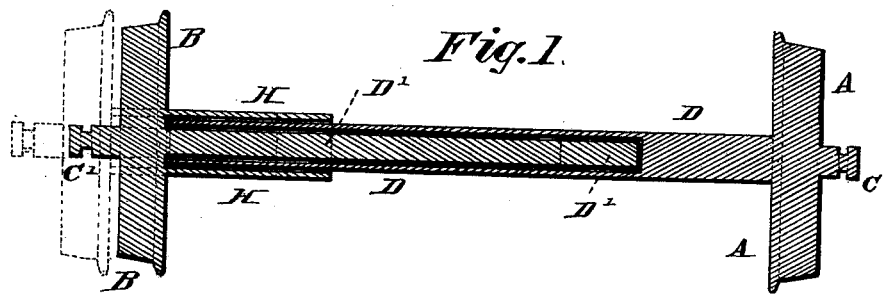
Figure 2:
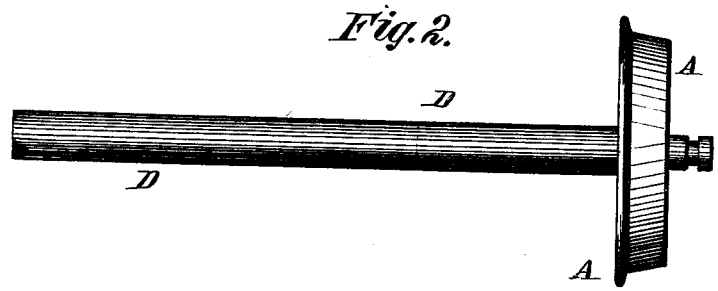
Figure 3:
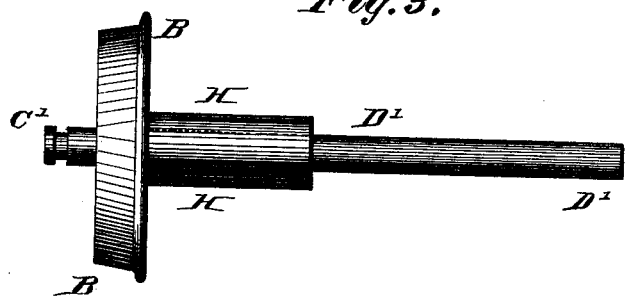

The annexed drawing, to which reference is made, fully illustrates my invention, and in said drawing, Figure 1 is a longitudinal section of my invention. Figs. 2 and 3 are side views of the two parts thereof.

A and B represent the two car-wheels of one pair or set, connected by a divide axle in the following manner: The wheel A is, on its outer side, formed or provided with the usual projecting journal C, to be placed and held in the car-axle journal-box, while from the inner side of said wheel extends the axle D, of such length as to reach to, or nearly to, the other wheel B. This axle D is made hollow or otherwise bored out from its outer end inward for a suitable distance, as shown.

The wheel B is, on the outer side, provided with a journal, C', similar to the journal C of the wheel A, and from the inner side of said wheel B projects an axle, D', of such dimensions as to fit in the bored-out or hollow portion of the axle D. From the inner side of the wheel B also extends a sleeve or elongated collar, H, concentric with the axle D', and of such diameter as to fit over the end of the axle D.

It will readily be seen that, though connected together by the divided axle D D', the wheels A and B can and do turn independent of each other, thus reducing the friction in going around curves. And, furthermore, the wheels may be easily changed from narrow gage to broad gage, and vice versa, the parts being, of course, made of such dimensions that suitable bearings will in either case be formed between the two parts D D' of the axle, and the sleeve H in both cases surrounds the end of the part D of the axle.

In the construction of this axle it will be noticed that each wheel A and B is formed with the respective parts belonging to it in such a manner that it is virtually in one piece, and no bolts, screws, or other extraneous fastenings are used.

I am aware that sleeves and axles have been used, the same being fastened by collars, grooves, bolts, &c.; but in my invention no grooves, collars, bolts, or screws are used, one part being slipped loosely within the other.

Having thus fully described my invention, what I claim as new, and desire to secure by Letters Patent, is—

The combination of the wheel A, provided with the journal C and bored-out or hollow axle D, and the wheel B, provided with the journal C', axle D', and sleeve or collar H, all substantially as described, and for the purposes set forth.

In testimony that I claim the foregoing as my own I have hereto affixed my signature in presence of two witnesses.

NATHANIEL JONES.

Witnesses:
   WM. B. UPPERMAN,
   C. H. WATSON.